United States Patent
Joki et al.

(10) Patent No.: US 6,490,935 B1
(45) Date of Patent: Dec. 10, 2002

(54) SYSTEM FOR MONITORING THE OPERATING CONDITIONS OF A BEARING

(75) Inventors: Mark A. Joki, Tuscarawas, OH (US); Kenneth W. Lindsay, Stark, OH (US)

(73) Assignee: The Timken Company, Canton, OH (US)

(*) Notice: Subject to any disclaimer, the term of this patent is extended or adjusted under 35 U.S.C. 154(b) by 0 days.

(21) Appl. No.: 09/407,208

(22) Filed: Sep. 28, 1999

(51) Int. Cl.[7] ............................. G01L 5/12; G01B 5/00
(52) U.S. Cl. ..................................................... 73/862.49
(58) Field of Search ........................ 73/862.04, 862.54, 73/862.67, 118.1, 593, 660, 862.55, 862.65, 862.48, 9; 384/448, 459, 584

(56) References Cited

U.S. PATENT DOCUMENTS

| | | | |
|---|---|---|---|
| 4,194,393 A | | 3/1980 | Boley |
| 4,203,319 A | * | 5/1980 | Lechler ..................... 73/141 A |
| 4,341,122 A | | 7/1982 | Lechler et al. |
| 4,625,567 A | | 12/1986 | Frayer et al. |
| 4,796,474 A | * | 1/1989 | Koenig ........................ 73/448 |
| 5,140,849 A | | 8/1992 | Fujita et al. |
| 5,192,138 A | * | 3/1993 | Faye et al. ................... 384/448 |
| 5,488,871 A | * | 2/1996 | Harbottle et al. ......... 73/862.55 |
| 5,952,587 A | | 9/1999 | Rhodes et al. |

FOREIGN PATENT DOCUMENTS

| | | |
|---|---|---|
| DE | 4218949 | 12/1993 |
| DE | 19522543 | 2/1996 |
| EP | 0018936 | 12/1980 |
| EP | 0665423 | 1/1994 |
| FR | 2125926 | 9/1972 |
| GB | 1378685 | 12/1974 |

* cited by examiner

Primary Examiner—Benjamin R. Fuller
Assistant Examiner—Octavia Davis
(74) Attorney, Agent, or Firm—Polster, Lieder, Woodruff & Lucchesi, L. C.

(57) ABSTRACT

A tapered roller bearing has at least one groove in its fixed race, with that groove being located behind and presented away from the raceway for the race. The groove, which creates an unsupported beam within the race, contains a strain sensor which is oriented to detect strains in the circumferential direction. The presence of a loaded roller over the beam deflects the beam and causes the sensor to produce a signal, with the magnitude of the signal reflecting the magnitude of the load transmitted by the roller. By locating one sensor where the greatest radial load is transmitted and two sensors 30° to 70° symmetrically on each side of that one sensor, one can measure both radial and axial loads in the bearing. By locating two sensors in a single groove, axially aligned, but also axially offset, one can detect misalignment of the raceways along which the rollers roll and also skewing of the rollers. By locating one sensor 90° from the location of the greatest radial load, one can measure the axial load in the bearing. An arrangement similar to the foregoing may also be used to ascertain the torque transmitted by a shaft supported on the bearing.

17 Claims, 3 Drawing Sheets

END PLAY

ZERO CLEARANCE

LIGHT PRELOAD

HEAVY PRELOAD

SYSTEM FOR MONITORING THE OPERATING CONDITIONS OF A BEARING

CROSS-REFERENCE TO RELATED APPLICATIONS STATEMENT REGARDING FEDERALLY SPONSORED RESEARCH OR DEVELOPMENT

Not Applicable.

BACKGROUND OF THE INVENTION

The present invention relates to antifriction bearings that have the capacity to transmit radial and axial loads through raceways that are oriented obliquely to the axes of the bearings, and more particularly to a process for monitoring operating conditions of such bearings and to bearings which may be so monitored.

Once a typical antifriction bearing is installed and set into operation, very little is known about the conditions under which it operates. In the case of a tapered roller bearing or an angular ball bearing, both of which have raceways orientated obliquely to the axis of rotation so that the bearing will transmit axial (thrust) loads as well as radial loads, temperature variations or other conditions may impart excessive preload to the bearing or perhaps too much end play. Both can shorten the life of a bearing. Misalignment of the races may develop without notice, and it also detracts from the operation and life of the bearing. In the case of a roller bearing, rollers may skew without anyone knowing about it, and that is also detrimental.

BRIEF SUMMARY OF THE INVENTION

The present invention resides in a bearing having strain sensors located behind the raceway one of its races. The sensors are oriented to detect strains in the circumferential direction and will detect the presence of a loaded roller over the region of the raceway behind which the roller lies. The location and number of sensors determines the bearing condition which is monitored. The invention also resides in the process embodied in monitoring bearings.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

Figure 1:
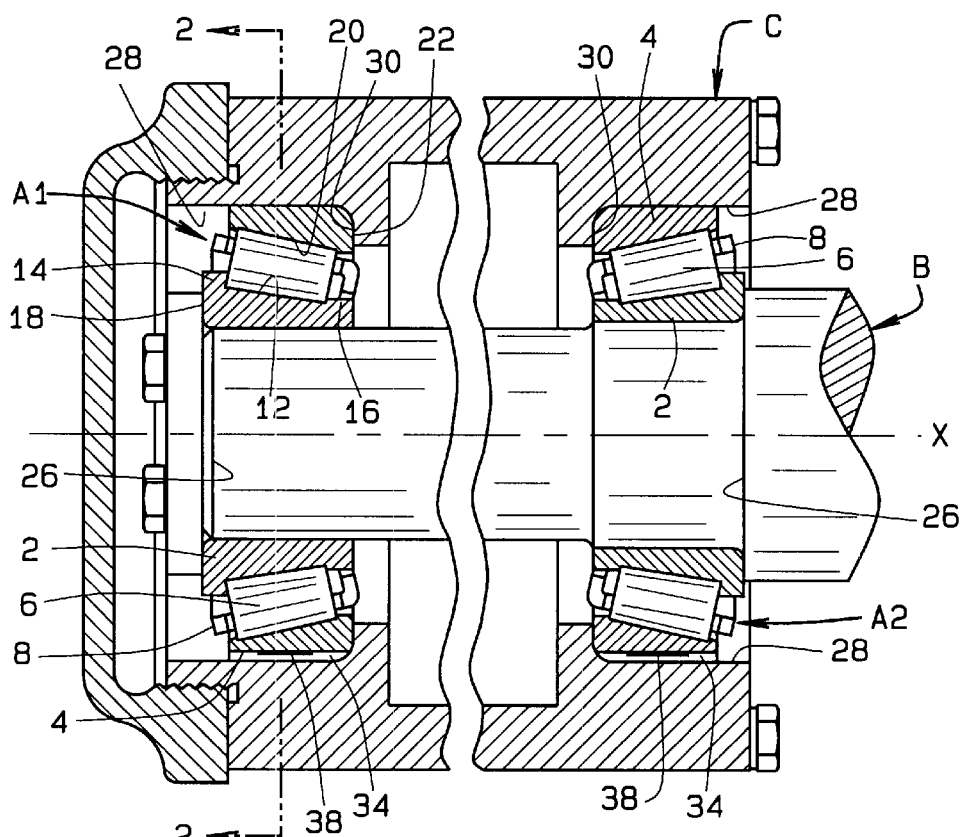
FIG. 1 is a sectional view of a shaft supported in a housing on bearings constructed in accordance with and embodying the present invention.

Referring to the drawings, a pair of tapered roller bearings A1 and A2 (FIG. 1) supports a shaft B in a housing C such that the shaft B rotates about an axis X. The bearings A1 and A2, which share the axis X, are mounted in opposition and thus confine the shaft B both radially and axially. Hence, they transmit both radial and axial loads between the shaft B and the housing C. Moreover, the bearings A1 and A2 have the capacity to detect axial and radial loads carried by them and to measure the magnitude of those loads as well.

Each bearing A1 and A2 includes (FIG. 1) an inner race in the form of a cone 2 that fits around the shaft B, and outer race in the form of a cup 4 that fits into the housing C, and rolling elements in the form of tapered rollers 6 located in a single row between the cone 2 and the cup 4. The rollers 6 in the bearing A1 are oriented opposite to the rollers 6 in the bearing A2, so that the two bearings A1 and A2 together accommodate axial loads in both directions. Typically, the small ends of the rollers 6 for the two bearings A1 and A2 are presented toward each other, so that the bearings A1 and A2 are mounted in the indirect configuration. Each bearing A1 and A2 also has a cage 8 which separates the rollers 6 and maintains the correct spacing between them.

Each cone 2 includes (FIG. 1) a tapered raceway 12 that is presented outwardly away from the axis X, a thrust rib 14 at the large end of the raceway 12, and a retaining rib 16 at the small end. The thrust rib 14 extends axially to a back face 18 which is squared off with respect to the axis X. Each cup 4 has a tapered raceway 20 which is presented inwardly toward the tapered raceway 12 of the cone 2. The raceway 20 at its small end extends out to a back face 22 which is likewise squared off with respect to the axis X.

The rollers 6 lie in a circular row between the tapered raceways 12 and 20 of the cone 2 and cup 4, respectively, there being line contact between the side faces of the rollers 6 and the raceways 12 and 20. The large ends of the rollers 6 bear against the thrust rib 14 of the cone 2 which prevents the rollers 6 from being expelled from the bearing A1 or A2. The rollers 6 are on apex, meaning that the conical envelopes in which their side faces reside have their apices at a common point along the axis X. Of course, the conical envelopes in which the raceways 12 and 20 reside have their apices at the same point along the axis X.

The cone 2 of each bearing A1 and A2 fits around the shaft B with its back face 18 against a shoulder 26 on the shaft B. Actually, the shoulder 26 that lies behind the cone 2 for the bearing A1 is on an end plate that is bolted to the shaft B The cup 4 of each bearing A1 and A2 fits into a bore 28 in the housing C with its back face 22 against a surface 30 at the end of the bore 28. The spacing between the two shoulders 26 on the shaft B and the spacing between the two surfaces 30 in the housing C determines the setting for the two bearings A1 and A2. That setting may be one of preload in which no axial or radial free motion exists between the shaft B and housing C, or the setting may be one of end play where axial free motion exists between the shaft B and housing C.

The shaft B rotates in the housing C on the bearings A1 and A2, and when this occurs, the rollers 6 of the two bearings A1 and A2 roll along the raceways 12 and 20 of the cones 2 and cups 4, respectively. Relatively little friction develops because the rollers 6 are on apex. The bearings A1 and A2, while accommodating rotation, confine the shaft B both radially and axially.

Figure 2:
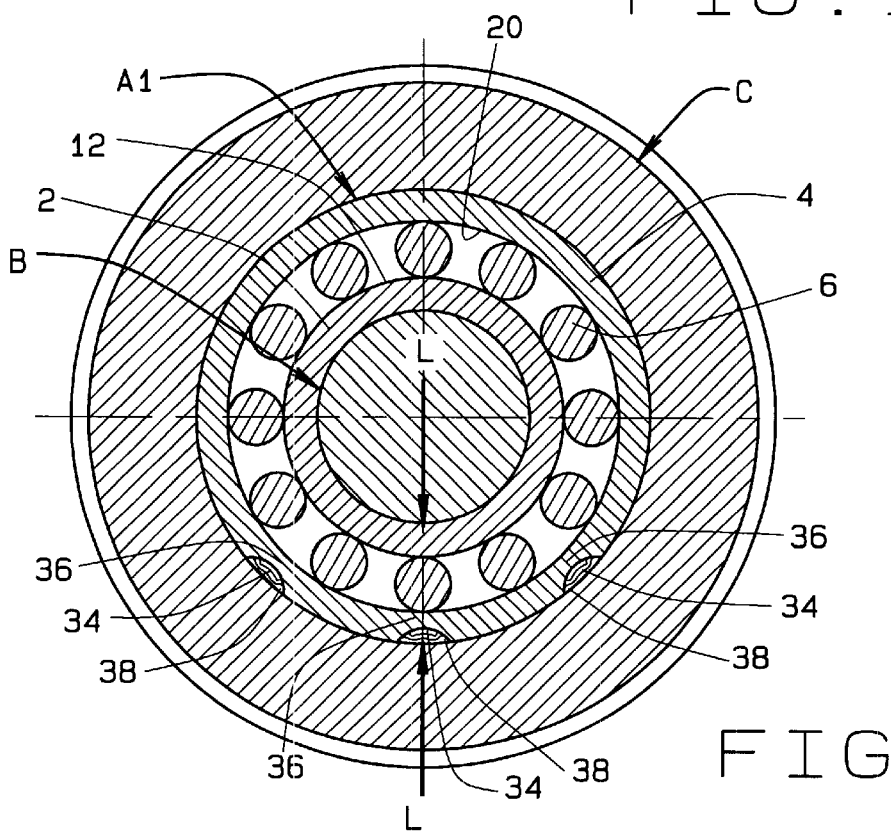
FIG. 2 is a sectional view taken along line 2—2 of FIG. 1.
Figure 3A:
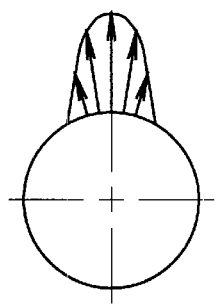
FIGS. 3A, 3B, 3C and 3D illustrate with polar coordinates the operating conditions that the bearings of FIG. 1 may encounter and detect.
Figure 3B:
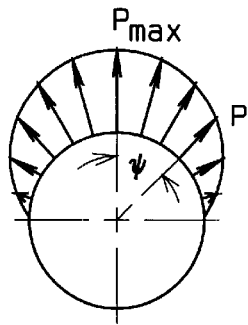
Figure 3C:
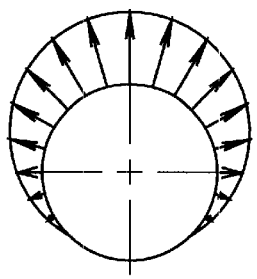
Figure 3D:
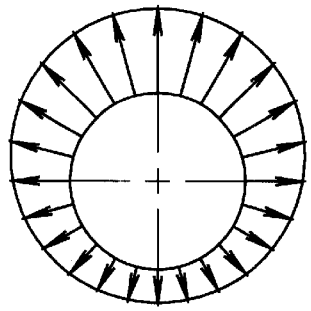

The cup 4 of each bearing A1 and A2 contains three grooves 34 (FIG. 2) which lie behind the raceway 20 for the cup 4 and open radially away from the axis X. Each groove 34 possesses an arcuate cross section and extends axially for the full length of the cup 4, but its depth remains constant throughout its length. The grooves 34, however, are relatively shallow so that they do not detract significantly from the structural integrity of the cup 4. Nonetheless, they provide three locations at which the cup 4 more easily flexes than elsewhere. In effect, they provide within the cup 4 three circumferentially extending beams 36 which are anchored at their ends by the thicker regions of the cup 4, but are otherwise unsupported. Each beam 36 flexes each time a loaded roller 6 passes over the region of the cup raceway 20 that is located immediately inwardly from it, although the flexure is ever so slight.

The cup 4 flexes enough at its beams 36 to enable the flexure to be detected by strain sensors, typically in the form of resistive-type strain gages, that are currently available. Indeed, each groove 34 contains that type of strain sensor 38 which is attached with an epoxy to the mid-portion of the beam 36 overlying that groove 34, which is of course the bottom of the groove 34. Each sensor 38 is oriented to detect expansions and contractions in the circumferential direction. Thus, as a roller 6 which is transmitting a radial load passes over that portion of the cup raceway 20 that lies over one of the beams 36, it flexes and elongates the beam 36. The strain sensor 38 detects that elongation and produces a signal which reflects it. Then as the roller 6 moves beyond the beam 36, the beam 36 returns to its original configuration, producing a contraction as it does. The strain sensor 38 detects this contraction, and its signal reflects the contraction. The magnitude of the elongation and likewise the signal varies with the load exerted by the roller 6 on the raceway 20.

The center groove 34 is normally aligned with the radial load transmitted by the bearing A1 or A2 and is thus located where the radial load is most heavily concentrated, that is at the resultant for the radial load. Usually that is directly downwardly. The two other grooves 34 are located symmetrically on each side of the center groove 34, each being offset between 30° and 70° from the center groove 34.

The internal load distribution in a tapered roller bearing which is subjected to radial loading may be depicted on polar coordinates, with the rollers that actually transfer the load being within a so-called "load zone" (FIG. 3). Actually, loads appearing on the polar coordinates are loads that are normal to the rollers, either at the cone raceway or cup raceway, but typically the latter. When the bearing A1 or A2 operates with end play only, a few rollers transfer the load, and the load zone is quite small (FIG. 3A). When the bearing A1 or A2 operates at zero clearance, which is a condition between end play and preload (no end play and no preload), half the rollers 6 transmit the load, although not equally, and the load zone extends 180° (FIG. 3B). In light preload most, but not all, of the rollers 6 transmit the load, and the load zone exceeds 180°, but is less than 360° (FIG. 3C). Under heavy preload, all rollers 6 transfer the load, and the load zone extends a full 360° (FIG. 3D).

From the shape of the polar graph that represents the load zone, one can determine the relationship between the radial and axial loads transmitted by a bearing. And the signals produced by the strain sensors 38 reveal that relationship. The following relationship exists:

$$\frac{P}{P_{\max}} = \left[1 - \frac{1}{2\varepsilon}(1 - \cos\Psi)\right]^b$$

where $P_{max}$ is the normal force exerted on the roller 6 that is over the center groove 34, that is at the roller 6 that transfers the greatest load.

P is the normal force exerted on the roller 6 over one of the other two grooves 34.

$\psi$ is the angle between the center groove 34 and the other groove 34 at which the force P exists.

$b$ is the contact deflection exponent.

With regard to the exponent $b$, it represents the deflection at the region of contact between the side face of a roller 6 and the raceway 20 along which it rolls. This deflection, which takes into account the linear deflection of the beam 36 and the nonlinear deflection of the roller 6, is represented by the formula $P=k\delta^b$ bin which:

P is the contact load at the beam 36 k is a constant $\delta$ is the deflection normal of the beam 36 at the groove 34. Normally the exponent $b$, which is available from texts, ranges between 1.1 and 1.5.

The signals derived from the strain sensors 38 at the grooves 34 behind the beams 36 which see the loads $P_{max}$ and P reflect the magnitude of those loads, so the ratio of the signals from the strain sensors 38 provides the ratio $$\frac{P}{P_{\max}}.$$

The angle $\psi$ is known and so is the contact deflection exponent b. This enables one to calculate $\epsilon$.

The radial load R at any point along the raceway 20, that is at an angle $\psi$ from the load $P_{max}$, is $$R = P_{\max}\cos\alpha \sum \left[1 - \frac{1}{2\varepsilon}(1 - \cos\Psi)^b \cos\Psi\right]$$

The thrust load T is:

$$T = P_{\max}\sin\alpha \sum \left[1 - \frac{1}{2\varepsilon}(1 - \cos\Psi)^b\right]$$

where $\alpha$ is the included angle between the cup raceway 20 and the axis X.

These calculations for deriving the radial load R and thrust load T require the ratio of only two sensors 38, the sensor 38 located in the center groove 34 and the sensor 38 located in one of the other grooves 34, so theoretically the loads R and T could be derived from a bearing A having only two grooves 34. After all, the load zone is symmetrical about the maximum load $P_{max}$. However, the three grooves 34, with the two end grooves 34 being symmetrical about the center groove 34, enable one to confirm that the maximum load $P_{max}$ exists at the center groove 34. If it does not, the formulas should be adjusted to reflect the offset.

Each strain sensor 38 is in effect a resistor, the resistance of which increases with elongation. The actual signal produced by the strain sensor 38 resides in an electrical potential across the resistor that forms the sensor 38. But the resistance of the resistor that forms the strain sensor 38 also varies with temperature. To counteract the changes in resistance produced by the temperature variations, the groove 34 which contains the strain sensor 38 may also contain a temperature sensor which counteracts and offsets those changes in the resistance of the sensor 38 that are caused by temperature variations alone.

More specifically, the strain sensor 38 is supplied with a constant current source and produces a voltage proportional to the strain. The voltage is low pass filtered to remove high frequency content as is required for proper digitization. The filtered signal is then converted to a digital number by an analog to digital converter (A/D). The roller pass strain produced by a roller 6 passing over the groove 34 in which the sensor 38 is located is extracted from the combined strain signal by calculating the FFT of the waveform and extracting the highest non-DC component. In some cases it may be possible to simply extract the peak-to-peak amplitude. This extracted roller pass strain is then linearized by an experimentally measured linearizing function. The linearized output is now in the form of a roller load.

Much of the circuitry which process signals from the strain sensor 38 in a groove 34 may be located within the groove 34 itself. For example, the groove 34 should contain the temperature sensor which compensates for temperature variations in the strain sensor 38 so that the temperature sensor experiences the same temperature variations as the strain sensor 38. The groove 34 may also contain a memory device.

The bearing A1 or A2 will operate best when the axis of the cone 2 for each coincides with the axis for the surrounding cup 4, or more precisely when the axes of the two raceways 12 and 20 coincide. But misalignment may occur, and one should know about it so that it may be corrected. After all, misalignment produces non-uniform stress concentrations where the side faces of the rollers 6 contact the raceways 12 and 20 and may even cause stress concentrations at the ends of the rollers 6. Typically, misalignment develops by reason of inaccuracies in machining, but a heavy load may deflect the shaft B significantly and cause misalignment as well. Likewise, deformations of the housing C through temperature variations within it or unequal loads may cause misalignment. Apart from that, certain conditions, such as inadequate lubrication, may cause the rollers 6 to skew between the raceways 12 and 20. Skewing places the rollers 6 off apex, so that true rolling contact does not exist between their tapered side faces and the raceways 12 and 20.

Figure 4:
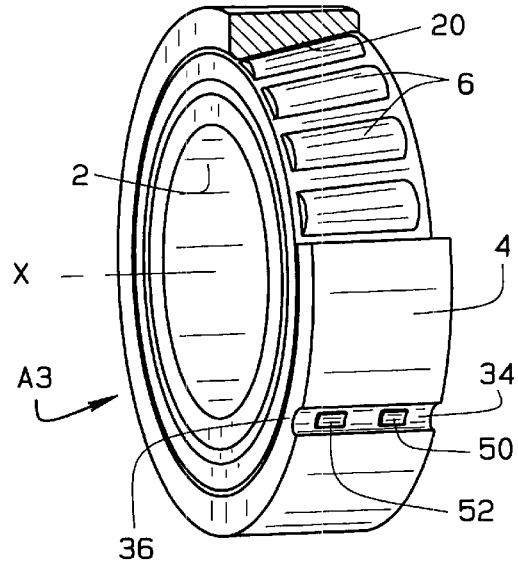
FIG. 4 is a perspective view, partially broken away and in section, of a modified bearing.

A modified bearing A3 (FIG. 4), which has a cone 2, a cup 4 and rollers 6, has the capacity to detect misalignment between the raceways 12 and 20 of its cone 2 and cup 4. The bearing A3 has at least one groove 34 in its cup 4, and that groove 34 creates an unsupported beam 36. The groove 34 contains two strain sensors 50 and 52 which are attached with an epoxy to the beam 36 midway between its ends, which is in the deepest part of the groove 34. Both strain sensors 50 and 52 are oriented to detect expansions and contractions in the circumferential direction. Moreover, they are spaced axially from each other in the groove 34.

As the rollers 6 under load pass over the region of the raceway 20 that lies along the beam 36, the beam 36 will deflect and the strain sensors 50 and 52 will produce signals which reflect that deflection. If the sensors 50 and 52 in the groove 34 detect different strain levels, the raceways 12 and 20 do not align. If the signals from the strain gages 50 and 52 do not coincide in time, the rollers 6 are skewed between the raceways 12 and 20.

Figure 5:
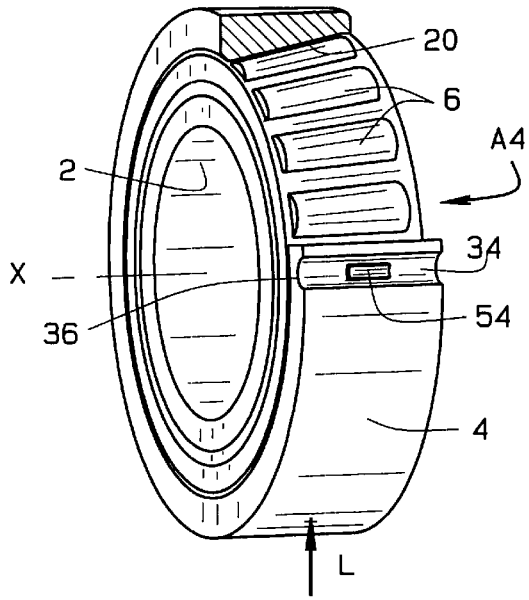
FIG. 5 is a perspective view, partially broken away and in section, of another modified bearing.

Still another modified bearing A4 (FIG. 5) operates under preload and has the capacity to monitor the magnitude of the preload that exists within it. When the bearing A4 operates under preload, the shaft B, other than being free to rotate, is otherwise fixed in position with respect to the housing C and is the axis X. No radial or axial free motion exists in the bearing A4. But too much preload can damage a bearing A4, and when the housing C and the shaft B are formed from metals having different coefficients of thermal expansion, temperature variations will change the preload in the bearing A4. Furthermore, over time the preload originally set into the bearing A4 will diminish with wear.

The bearing A4 likewise has a cone 2, cup 4 and tapered rollers 6 arranged in a single row between the raceways 12 and 20 on the cone 2 and cup 4. Moreover, it is mounted in opposition to a similar tapered roller bearing (not shown). The cup 4 for the bearing A4 has a groove 34 which creates an unsupported beam 36 in the cup 4. The groove 34 contains a strain sensor 54 which is attached with an epoxy to the cup 4 midway between the ends of the groove 34, which is of course at the center of the beam 36. The strain sensor 54 is oriented such that it detects expansions and contractions in the circumferential direction. The groove is oriented 90° from the direction of the applied radial load or the resultant L of that load. As such it opens laterally away from that resultant L.

Should the bearing A4 operate in a condition of end play, the rollers 6 at the beam 36 will transmit no load and the beam 36 will not deflect. The strain sensor 54 will not register any deflection of the beam 36 as the rollers 6 pass over it.

Even when the bearing A4 operates in a condition of zero end play (but without preload) the rollers at the beam 36 will not see any load, nor will the strain sensor 54 reflect any deflection of the beam 36. But when the bearing A4 operates at preload, the rollers 6 passing over the beam 36 will transmit some load between the raceways 12 and 20, and that load will deflect the beam 36, causing the strain sensor 54 to produce a signal which reflects the expansions and contractions of the beam 36. The magnitude of the signal reflects the amount of the preload.

In order to provide a reference against which signals may be measured, the bearing A4 should be operated at a known preload without any applied radial load or axial load. Subsequent tests of the bearing A4 are conducted under similar conditions. By comparing the original signal with subsequent signals, one can determine the amount of preload the bearing A4 has lost or gained.

The capacity of the bearings A to measure thrust renders them useful in measuring torque transmitted through in a transmission.

Figures 6, 7:
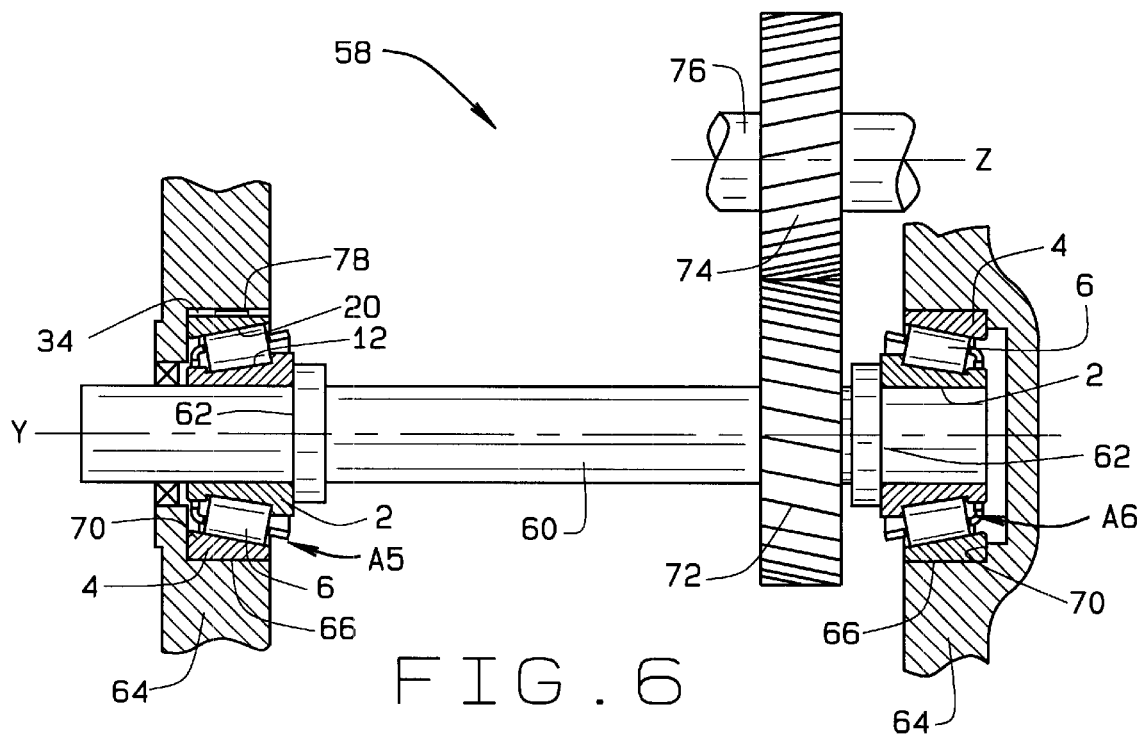
FIG. 6 is a sectional view of a transmission in which one of the bearings monitors torque.
FIG. 7 is a perspective view, partially broken away and in section, of still another modified bearing.

More specifically, a transmission 58 (FIG. 6) contains a shaft 60 which rotates in two single row tapered roller bearings A5 and A6 mounted in the direct configuration. The bearings A5 and A6 establish an axis of rotation Y for the shaft 60 and, like other bearings A, each bearing A5 and A6 includes a cone 2, a cup 4, and tapered rollers 6. But, being in the direct configuration, the bearings A5 and A6 have the large ends of the rollers 6 for the two rows presented toward each other. Actually, the shaft 60 fits into the cones 2 of the two bearings A5 and A6 with a slight interference fit, and the axial position of the cones 2 are established by two shoulders 62 on the shaft 60. The back faces 18 of the two cones 2 bear against the shoulders 62.

The shaft 60 extends through a housing 64 containing aligned bores 66 which open toward each other and receive the cups 4 of the two bearings A5 and A6, again with a slight interference fit. The bores 66 terminate at surfaces 70 against which the back faces 22 of the two cups 4 bear, so that the surfaces 70 establish the axial positions of two cups 14. Here the cups 4 of the bearings A5 and A6 remain fixed while the cones 2 rotate. The distance between the shoulders 62 on the shaft 60, the distance between the surfaces 70 in the housing 64 controls the setting for the bearings A5 and A6, and that setting may be one of end play or one of preload.

The shaft 60 in the region between the two bearings A5 and A6—and indeed adjacent to the bearing A6—carries a drive gear 72 which fits firmly to the shaft 60 so that the gear 72 rotates with the shaft 60. The gear 72, in turn, meshes with a driven gear 74 which is fitted firmly to another shaft 76 that rotates about an axis Z established by bearings (not shown) that are likewise set into the housing 64. The axis Z lies parallel to the axis Y for the shaft 60.

Both of the shafts 60 and 76 extend through the housing 64. Power is applied to the shaft 60 which transmits it through the meshed gears 72 and 74 to the shaft 76, and thus the power is delivered from the shaft 76. The gears 72 and 74 may be typical spur gears or helical gears. Where helical gears are used, they should be oriented such that the thrust resulting from their helical configuration is directed toward and resisted by the bearing A5.

The cup 4 of the bearing A5, which is the bearing that is remote from the drive gear 72, contains an axially directed groove 34 which extends the full length of the cup 14, which is arcuate in cross section so as to create an unsupported beam in the cup 4. The groove 34 contains a strain sensor 78 which is attached to the cup 4 with an epoxy or some other suitable bonding substance, it being oriented to sense expansions and contractions in the circumferential direction.

When the shafts 60 and 76 rotate without transferring any power, the system of bearings A5 and A6 reacts differently than when power—and likewise torque—is transmitted. Considering first the absence of power, with the bearings A5 and A6 set to a condition of end play, the strain gage 78 will detect essentially no expansions or contractions in the beam 36 of the cup 4 for the bearing A5. On the other hand, if bearings A5 and A6 are set to a condition of preload, the strain sensor 78 will detect expansions and contractions in the cup 4, and these will be reflected in the signal produced by the strain sensor 78. The amplitude of that signal represents the preload in the bearings A5 and A6. That amplitude is stored as a reference. Indeed, each time the shaft 60 reverts to essentially no torque, the amplitude of the signal derived from the strain sensor 78 is stored.

But a load or demand placed upon the driven shaft 76 requires the application of power and torque to the drive shaft 60, lest the load will bring the shafts 60 and 76 to a stall. The torque applied to the drive shaft 60 is transmitted to the driven shaft 76 through the meshed gears 72 and 74, and in the region where they mesh or engage a tangential force exists, with the magnitude of that force being dependent on the magnitude of the torque. After all, the torque in the shaft 60 represents simply the tangential force multiplied by the distance through which it operates, which is the radius of the pitch circle for the drive gear 72. In any event, the tangential force that exists where the gears 72 and 74 mesh is resisted by an opposite radially directed force applied to the nearby end of the shaft 60. Since that end of the shaft 60 is captured in the cone 2 of the bearing A6, the resisting force is transmitted through the bearing A6 to the housing 64. Within the bearing A6 the resisting force acquires an axial component, owing to the inclination of its raceways 122 and 20 and the tapered geometry of its rollers 6. This axial component thrusts the entire shaft 60 toward the bearing A5, and the bearing A5 resists the thrust. But the thrust acts like a preload in that it urges the rollers 6 with increased force against the raceway 12 and 20 of the cone 2 and cup 4 for the bearing AS. As a consequence, the rollers 6 impart cyclic expansions and contractions to beam 36 as they pass over the portion of the raceway 20 that is at the beam 36. The magnitude of the cyclic expansions in the beam 36 depends on the magnitude of the thrust applied to the shaft 60, and that in turn is dependent on the magnitude of that force transmitted through the bearing B4 which resists the tangential force where the two gears 72 and 74 mesh. In other words, it reflects the torque transmitted through the shaft 60.

Sometimes the housing C will rotate about the shaft B as when the shaft B is a fixed spindle and the housing C is a wheel hub mounted on the spindle. A modified bearing A7 (FIG. 7) accommodates the rotation. The bearing A7 has a cone 2, cup 4 and rollers 6. The cone 2 is provided with a groove 84, which is similar to the groove 34. To this end it has the same arcuate cross section as the groove 34 and extends the full length of the cone 2 while maintaining uniform depth. The groove 84 creates an unsupported beam 86 in the cone 2 and contains a strain sensor 88 which is oriented to detect expansions and contractions in the circumferential direction.

In each of the bearings A1 and A2 and the bearings A3 and A4 as well, the cups 4 of those bearings have the grooves 34 which create the unsupported beams 36 and contain the sensors—and the cups 4 remain fixed while the cones 2 rotate. On the other hand, in the bearing A7 the groove 86 extends through the cone 2, but the cup 4 rotates, not the cone 2. Thus, in each of the bearings A1, A2, A3, A4 and A7 the fixed race carries the sensor or sensors for the bearing, and well they should since the sensors form part of circuitry that monitors the bearing and have wires leading from them to other components of the circuitry. But some equipment, the bearings are better monitored at the rotating race, that is to say at the cone 2 for anyone of the bearings A1, A2, A3 or A4 or at the cup 4 for the bearing A7. This enables one to monitor the rotating cone 2 or cup 4 as it travels into and out of the load zone.

To this end, the rotating race or the rotating component on which the rotating race is mounted is fitted with a computer and a battery for powering the computer. The computer collects information from sensors on the rotating race and stores that information, to be downloaded after the bearing is brought to rest. It also stores information relating to calibration and identification of the bearings. On the other hand, the computer could be coupled inductively to the fixed race to transfer power to it and signals from it. Signals could be also transferred by telemetry.

This invention is intended to cover all changes and modification of the example of the invention herein chosen for purposes of the disclosure which do not constitute departures from the spirit and scope of the invention.

What is claimed is:

1. An antifriction bearing for accommodating rotation about an axis while transmitting a load that is directed at an angle with respect to the axis, said bearing comprising: an inner race having a tapered raceway presented outwardly away from the axis; an outer race having a tapered raceway presented inwardly toward the raceway of the inner race; tapered rollers located between the races and contacting the raceways, whereby the rollers will roll along the raceways when relative rotation occurs between the races; one of the races having a first groove located directly behind the raceway of that race and generally aligned with the load, said one race also having a second groove located directly behind the raceway of that race and located between 30° and 70° from the first groove, the grooves extending axially in said one race and forming unsupported beams in said one race; and a first strain sensor attached to said one race in the first groove and a second strain sensor attached to said one race in the second groove, the sensors being capable of detecting strains in the beams of said one race and being oriented to detect strains in the circumferential direction.

2. A bearing according to claim 1 wherein the groove in the one race is arcuate in cross section.

3. An antifriction bearing according to claim 1 wherein said one race further has a third groove behind the raceway of that race and located between 30° and 70° from the first groove, with the first groove being between the second and third grooves, and further comprising a third strain sensor in the third groove where the third sensor is oriented to detect strains in the circumferential direction.

4. An antifriction bearing according to claim 1 wherein the grooves are of uniform depth.

5. An antifriction bearing according to claim 1 wherein the grooves are arcuate in cross section.

6. An antifriction bearing according to claim 1 wherein the second and third sensors are located at equal angles from the first sensor.

7. An antifriction bearing for accommodating rotation about an axis while transmitting a load radially with respect to the axis, said bearing comprising: an inner race, that is subjected to the load, having a raceway presented outwardly away from the axis and also oriented obliquely with respect to the axis; an outer race, that is subjected to the load, surrounding the inner race and having a tapered raceway presented inwardly toward the raceway of the inner race and also oriented obliquely with respect to the axis; one of the races having an axially directed groove which opens out of that race behind the raceway of that race and is oriented approximately 90° from the radial load to form an unsupported beam in the race; rolling elements located between the races and contacting the raceways, whereby the rolling elements will roll along the raceways when relative rotation occurs between the races and create cyclic strains in the races; a sensor attached to the beam in said one race and having the capacity to detect strains in the race, the sensor being oriented to detect strains in the circumferential direction and being located approximately 90° from the location of the radial load, whereby the sensor will monitor preload in the bearing.

8. A bearing according to claim 7 wherein the raceways and rolling elements lie within conical envelopes.

9. An antifriction bearing according to claim 7 wherein the groove is of uniform depth.

10. An antifriction bearing according to claim 9 wherein the groove is arcuate in cross section.

11. A process for ascertaining the distribution of forces in a tapered roller bearing as a consequence of a load applied to and transferred by the bearing, said bearing facilitating rotation about an axis and having inner and outer races provided with opposed raceways and tapered rollers organized in a row between the raceways, so that the rollers will roll along the raceways when relative rotation occurs between the races, whereby the rollers will produce cyclic strains in the races, said process comprising: measuring strain in the circumferential direction on one of the races behind the raceway for that race at a location generally aligned with the load; measuring strain in the circumferential direction in the same race at a location that is offset between 30° and 70° in one circumferential direction from the load, and comparing the strains measured at the locations to ascertain the distribution of forces in the bearings.

12. The process according to claim 11 wherein the strains are compared in accordance with the formula $$\frac{P}{P_{\max}} = \left[1 - \frac{1}{2\varepsilon}(1 - \cos\Psi)\right]^b$$

where $\psi$ is the angle between the first and second sensors $b$ is the contact deflection exponent $$\frac{P}{P_{\max}}$$

is the ratio of strains measured at the location of the load and the location that is offset from the load.

13. The process according to claim 12 and further comprising ascertaining the radial force transferred at any location in the bearing offset from the load according to the formula $$R = P_{\max}\cos\alpha \sum \left[1 - \frac{1}{2\varepsilon}(1 - \cos\Psi_1)\right]^b \cos\Psi_1$$

Where $P_{max}$ is the normal force exerted on the roller along said one race at the location generally aligned with the load R is the radial load $\alpha$ is the angle between the raceway on said one race and the axis $\psi_1$ is the angle between load and the location offset from the load.

14. The process according to claim 11 wherein the locations at which the strains are measured are at beams in the race, with the beams being formed by axially directed grooves in the race and having less resistance to flexure than the remainder of the race.

15. The process according to claim 11 and further comprising measuring strain in said one race behind the raceway for that race at a location that is offset 30° to 70° in the other circumferential direction from the load.

16. The process according to claim 15 wherein the offset locations at which the strains are measured are symmetrical with respect to the location of the load.

17. The process according to claim 16 wherein the locations at which the strains are measured in said one race are unsupported beams formed by axially extending grooves in said one race, with the beams having less resistance to flexure than the remainder of race.

* * * * *